(12) United States Patent
Orehovsky et al.

(10) Patent No.: US 10,155,196 B2
(45) Date of Patent: Dec. 18, 2018

(54) CATALYTIC CONVERTER REACTOR

(71) Applicant: IBIDEN PORZELLANFABRIK FRAUENTHAL GMBH, Frauental an der Lassnitz (AT)

(72) Inventors: Kurt Orehovsky, Bad Badkersburg (AT); Michael Aumann, Vienna (AT); Andreas Hartung, Redwitz (DE); Thomas Krainer, Graz (AT); Thomas Nagl, Schwechat (AT); Gerhard Poelzl, Bad Gams (AT); Mario Schweiger, Graz (AT)

(73) Assignee: IBIDEN PORZELLANFABRIK FRAUENTHAL GMBH, Frauental an der Lassnitz (AT)

( * ) Notice: Subject to any disclaimer, the term of this patent is extended or adjusted under 35 U.S.C. 154(b) by 78 days.

(21) Appl. No.: 14/899,776

(22) PCT Filed: Jun. 20, 2014

(86) PCT No.: PCT/AT2014/000129
§ 371 (c)(1),
(2) Date: Dec. 18, 2015

(87) PCT Pub. No.: WO2014/201485
PCT Pub. Date: Dec. 24, 2014

(65) Prior Publication Data
US 2016/0144317 A1    May 26, 2016

(30) Foreign Application Priority Data
Jun. 19, 2013    (AT) ..................................... 494/2013

(51) Int. Cl.
*F01N 3/28* (2006.01)
*B01D 53/94* (2006.01)
(Continued)

(52) U.S. Cl.
CPC ...... *B01D 53/9431* (2013.01); *B01J 19/2485* (2013.01); *F01N 3/2066* (2013.01);
(Continued)

(58) Field of Classification Search
CPC ........ F01N 13/017; F01N 3/2066; F01N 3/28; F01N 3/2839; F01N 2260/06; B01D 53/9431
(Continued)

(56) References Cited

U.S. PATENT DOCUMENTS 4,101,290 A    7/1978  Arashi et al.
4,343,631 A *  8/1982  Ciliberti ............... B01D 46/002
                                                                55/302
(Continued)

FOREIGN PATENT DOCUMENTS

EP    1486649    12/2004
FR    2719628    11/1995
WO    9605906    2/1996

OTHER PUBLICATIONS

International Search Report from corresponding PCT Appln. No. PCT/AT2014/000129 dated Sep. 15, 2014. English translation attached.

*Primary Examiner* — Tom P Duong
(74) *Attorney, Agent, or Firm* — Grossman, Tucker, Perreault & Pfleger, PLLC

(57) ABSTRACT

A catalytic converter reactor having in-built catalytic converter modules, wherein the total flow impingement surface area provided by the catalytic converter elements fitted in the catalytic converter modules is larger than the flow impingement surface area of the catalytic converter reactor, the module impingement surface area being defined by the catalytic converter module surfaces facing the main flow direction, and the catalytic converter modules being positioned so that the waste gas flows through the catalytic
(Continued)

converter elements contained therein in a direction different from the flow direction on the intake and exit sides.

11 Claims, 4 Drawing Sheets

(51) Int. Cl.
*B01J 19/24* (2006.01)
*F01N 3/20* (2006.01)
*F01N 13/00* (2010.01)
*F23J 15/02* (2006.01)

(52) U.S. Cl.
CPC .............. *F01N 3/28* (2013.01); *F01N 3/2839* (2013.01); *F01N 13/017* (2014.06); *F23J 15/02* (2013.01); *F01N 2260/06* (2013.01); *F23J 2215/10* (2013.01); *F23J 2219/10* (2013.01); *Y02T 10/24* (2013.01)

(58) Field of Classification Search
USPC ................................................. 422/177, 180
See application file for complete search history.

(56) References Cited

U.S. PATENT DOCUMENTS

| | | | | |
|---|---|---|---|---|
| 5,593,645 A * | 1/1997 | Steenackers | ............. | B01J 35/04 422/176 |
| 6,096,682 A * | 8/2000 | Steenackers | ............. | B01J 35/04 422/180 |
| 8,747,788 B1 * | 6/2014 | Baig | .................... | F01N 3/2066 422/168 |

* cited by examiner

CATALYTIC CONVERTER REACTOR

FIELD OF THE INVENTION

The invention relates to a catalytic converter reactor having components comprising catalytic converter modules.

BACKGROUND

SCR catalytic converters are the state of the art for removing nitrogen oxide from waste gases. They contribute substantially to reducing ground-level ozone, acid rain and the greenhouse effect. This technology is used in thermal power plants and waste incineration plants, and also in internal combustion engines and in many commercial industries.

In addition to reducing nitrogen oxides, catalytic converters are also used for breaking down dioxins and furans, for example, which has become the recognized industrial standard, particularly in waste incineration plants.

Catalytic converter elements are available, for example, in the form of homogeneously extruded honeycomb elements or in the form of carrier materials, the surface of which is provided with a catalytic layer and which are referred to as plate-type catalytic converters. Additional variants include pellet-type catalytic converters, zeolite catalytic converters, in which the active layer is applied to a ceramic carrier by means of a washcoat process, and catalytic converters designed as corrugated plates.

For installation in SCR reactors, the individual catalytic converter elements are packed into catalytic converter modules (for example, steel modules), which are referred to in the assembly as a catalytic layer. Between the individual catalytic converter modules and between the catalytic converter modules and the wall of the reactor housing that holds the modules, seals are provided, which are designed to forcefully guide the flow of waste gas through the catalytic converter elements.

The pressure loss that is associated with installing the catalytic converter modules into the reactor is considered a critical performance parameter. Efforts are made to minimize this undesirable pressure loss. The pressure loss is influenced by the selected geometry of the catalytic converter elements, among other factors. However, the selected geometry is subject to production-based and process-based limits. The size of the SCR reactor likewise has a direct impact on the pressure loss. Thus leeway in terms of configuration is subject to certain limits: on one hand from on-site restrictions, particularly in the case of retrofitted SCR reactors, and on the other hand from economic considerations.

SUMMARY

The object of the invention is to provide catalytic converter modules that have the greatest possible catalytically active surface area, with a given limited reactor cross-section, while at the same time minimizing the pressure loss caused by the catalytic converter modules. This object is attained according to the invention with a catalytic converter reactor of the type indicated in the introductory part, in that the total of the flow impingement intake surface areas of the individual catalytic converter modules of each catalytic layer is greater than the flow intake surface area of the catalytic converter reactor, the module intake surface area being defined as the surface area of the catalytic converter module side that faces the main flow direction), and the catalytic converter modules being positioned in the catalytic converter reactor such that the waste gas flows through the catalytic converter elements contained therein in a direction different from the flow direction on the intake side and/or the outlet side.

The necessary catalytic converter surface area and the catalytic converter volume associated therewith is therefore provided by the arrangement according to the invention of the catalytic converter modules inside the catalytic converter reactor, which results in an increased overall depth of the catalytic converter module assembly. The cross-section of the SCR reactor remains unchanged.

According to an alternative embodiment, catalytic converter modules are also provided, through which waste gas flows in a direction parallel to the flow direction on the intake side and/or the outlet side. These modules can be located, for example, in the same catalytic layer and/or in a catalytic layer located upstream or downstream.

BRIEF DESCRIPTION OF THE DRAWINGS

In the following, the invention will be specified in greater detail in reference to the set of drawings, in which.

DETAILED DESCRIPTION

Figure 1:
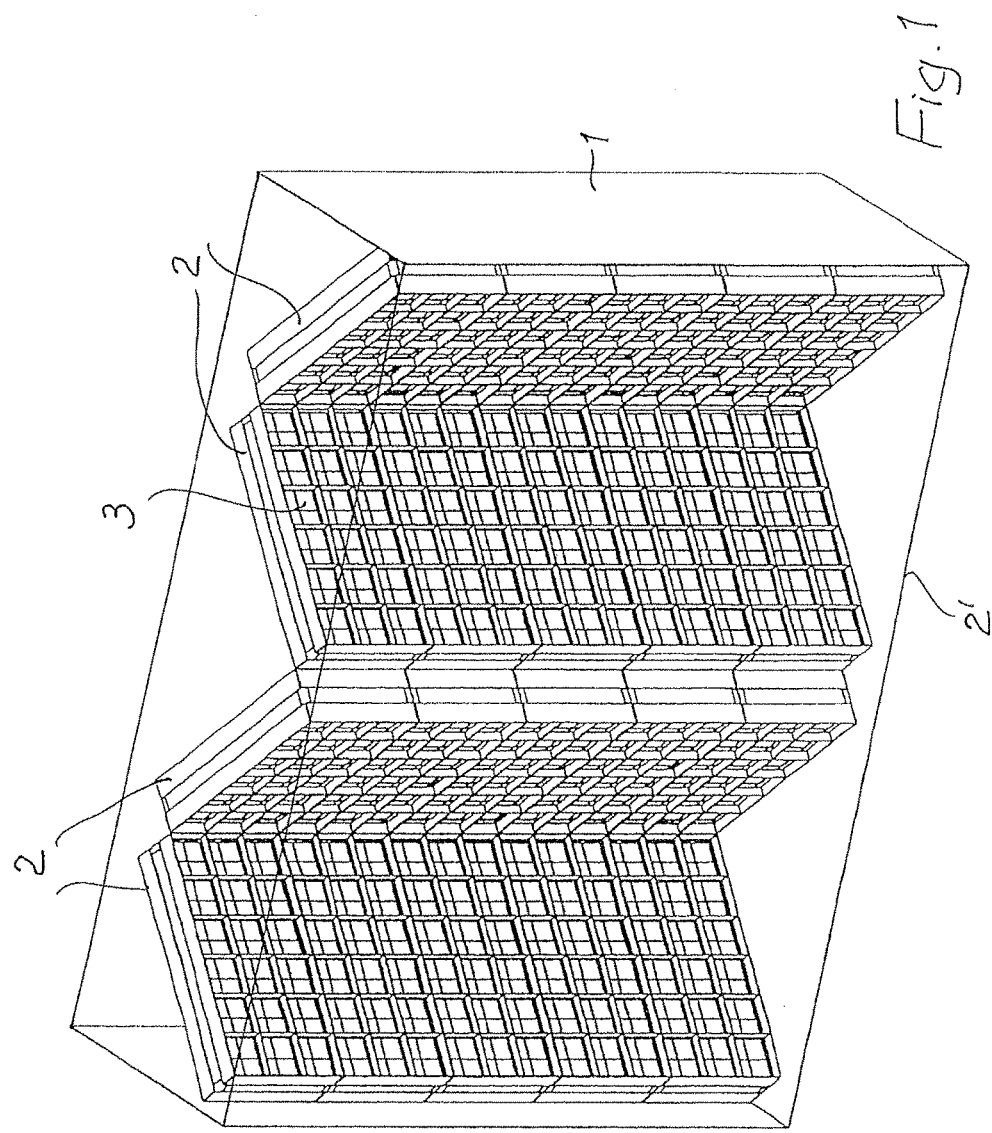
FIG. 1 shows a schematic perspective view of a catalytic converter reactor according to the invention.
Figure 2:
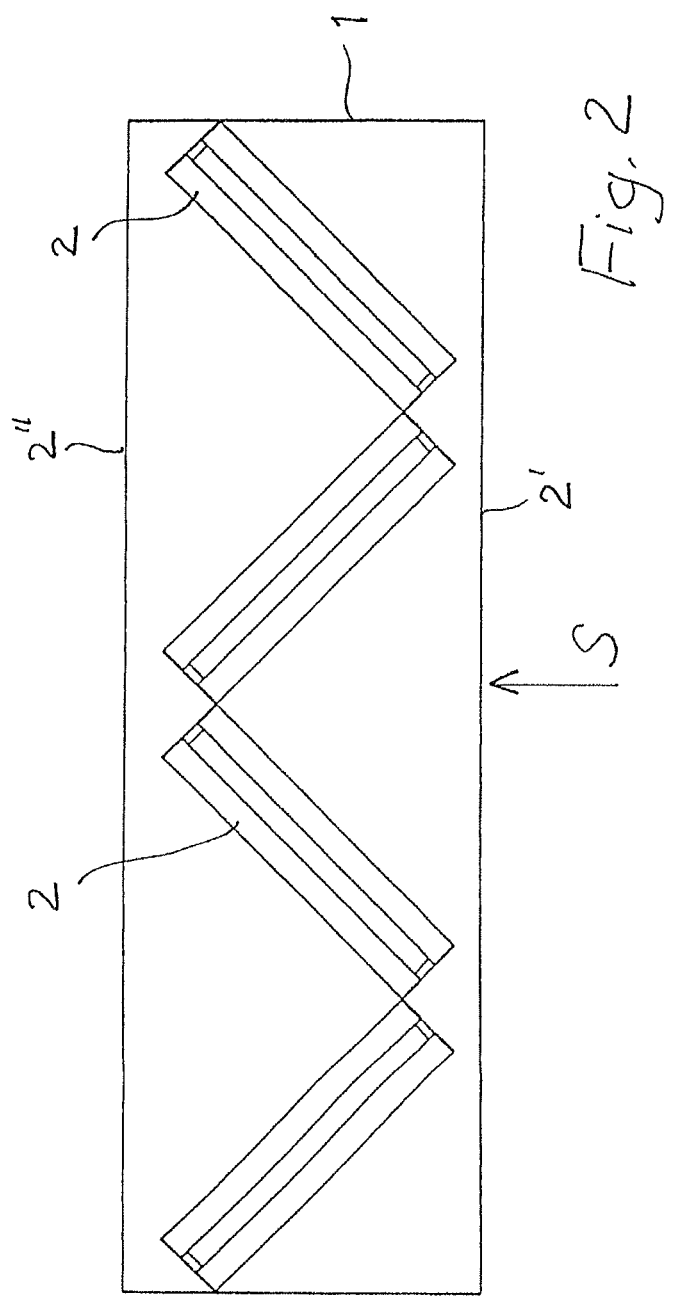
FIG. 2 shows a schematic plan view.
Figure 3:
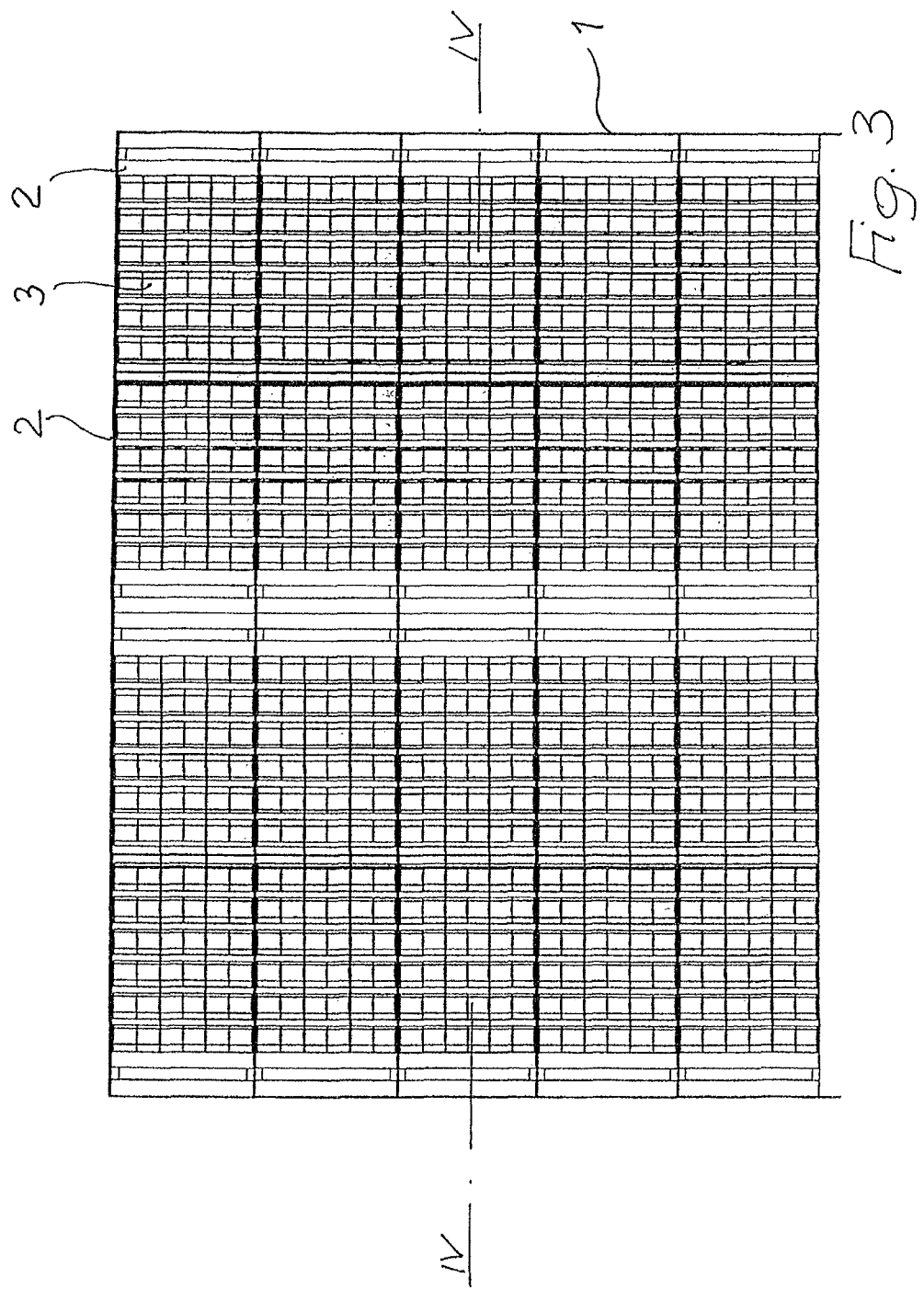
FIG. 3 shows a front view.
Figure 4:
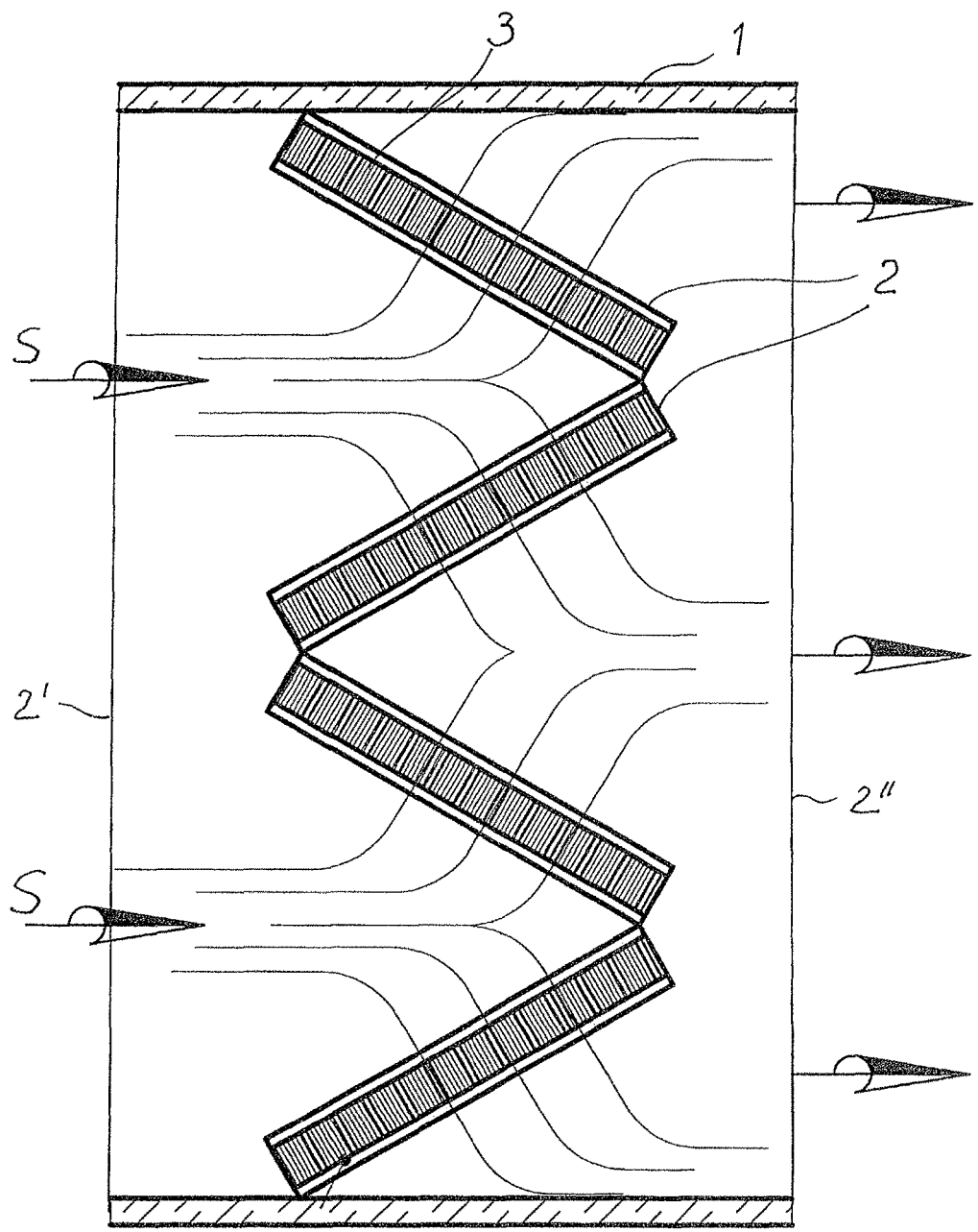
FIG. 4 shows a schematic section along the line IV-IV in FIG. 3.

The conventional configuration of a parallelepipedic catalytic converter reactor 1 is defined by a flow of waste gas S flowing within the catalytic converter module 2 from the intake side 2' of a catalytic converter module 2 through channels 4 of the catalytic converter elements 3 to the outlet side 2" of the catalytic converter module 2 without any deflection of the (main) flow direction generated by the catalytic converter.

With the configuration of the catalytic converter reactor 1 according to the invention, illustrated in the set of drawings, the parallelepipedic catalytic converter modules 2, in contrast to prior standard practice, are positioned differently in relation to the intake side 2' and/or the outlet side 2", or in relation to the direction of flow in the catalytic converter reactor 1. The flow through the catalytic converter elements 3 is therefore in a direction different from the flow direction on the intake side and/or the outlet side, for example slanted 60°. This particular arrangement of the catalytic converter modules 2, and associated therewith, the catalytic converter elements 3 within the catalytic converter reactor 1, allows the existing cross-section of the reactor system to be utilized over its entire depth. This results in a significant enlargement of the catalytic converter intake surface area within a catalytic layer while the cross-section of the catalytic converter reactor 1 remains the same.

The waste gas is conducted from the intake side 2' of the catalytic converter module 2 through the channels 4 of the catalytic converter elements 3. The catalytic converter modules 2 are arranged such that the catalytic converter elements 3 located therein and therefore the channels 4 thereof are oriented slanted 60°, for example, relative to the main flow direction S of the waste gas upstream of the module intake side 2', and are traversed accordingly. At the outlet side 2"

of each catalytic converter module 2, the waste gas rejoins the entire waste gas flow S, flowing in a direction parallel to the reactor wall.

The subject matter of the invention described above can be used, for example:
- to decrease the pressure loss induced by the catalytic converter while the reactor cross-section remains the same;
- to decrease the pressure loss induced by the catalytic converter while reducing the size of the reactor cross-section;
- to maintain the pressure loss induced by the catalytic converter with a reduced reactor cross-section or reduced number of catalytic layers.

Of course, the above-described embodiment may be modified as desired within the scope of the concept of the invention, particularly with respect to the position of the catalytic converter modules in the catalytic converter reactor or the position of the catalytic converter elements in the catalytic converter module.

What is claimed is:

1. A catalytic converter reactor comprising:
catalytic converter elements,
a total incident flow intake surface area of the catalytic converter elements being greater than a flow intake surface area of the catalytic converter reactor, the flow intake surface area of the catalytic converter reactor being defined by surfaces of the catalytic converter elements that face a main flow direction of the catalytic converter reactor,
the catalytic converter elements being contained in catalytic converter modules in the catalytic converter reactor,
the catalytic converter modules being positioned slanted such that waste gas flows through the catalytic converter elements contained therein in two alternating directions different from the main flow direction,
the catalytic converter modules being positioned one after another in a row, and
the row of catalytic converter modules form a plurality of adjoining V-shaped sections.

2. The catalytic converter reactor according to claim 1, wherein catalytic converter modules are also provided in which the waste gas flows through the catalytic converter elements of said modules parallel to the main flow direction on the intake side and/or the output side.

3. The catalytic converter reactor according to claim 1, wherein the catalytic converter modules are slanted at an angle of 60 degrees with respect to the main flow direction.

4. The catalytic converter reactor according to claim 1, further comprising a reactor housing, wherein the reactor housing provides an intake side to the catalytic converter reactor, wherein the intake side has a cross-sectional area, and wherein the cross-sectional area of the intake side of the reactor housing corresponds to the flow intake surface area of the catalytic converter reactor.

5. The catalytic converter reactor according to claim 1, wherein the plurality of catalytic converter modules comprise at least four catalytic converter modules positioned after one another in the row.

6. The catalytic converter reactor according to claim 1, wherein each V-shaped section of the plurality of adjoining V-shaped sections extends vertically.

7. A catalytic converter reactor having an intake side cross-sectional area at an entrance of the catalytic converter reactor, an outlet side cross-sectional area at an exit of the catalytic converter reactor and a main flow direction for waste gas through the catalytic converter reactor, the catalytic converter reactor comprising:
a plurality of catalytic converter modules, each of the catalytic converter modules containing a plurality of catalytic converter elements,
the plurality of the catalytic converter elements of each of the plurality of catalytic converter modules collectively providing a total catalytic surface area which faces the main flow direction,
the total catalytic surface area of the catalytic converter elements being greater than the intake side cross-sectional area of the catalytic converter reactor,
the plurality of catalytic converter modules being slanted relative to one another such that a flow of the waste gas flowing in the main direction is divided into two flow paths, the two flow paths diverging from the main flow direction at an angle relative to the main direction and each flow path extending through one of the plurality of catalytic converter modules and the catalytic converter elements contained therein,
the catalytic converter modules being positioned one after another in a row, and
the row of catalytic converter modules form a plurality of adjoining V-shaped sections.

8. The catalytic converter reactor according to claim 7, wherein the catalytic converter reactor has a parallelepipedic geometry.

9. The catalytic converter reactor according to claim 7, wherein the plurality of catalytic converter modules each have a parallelepipedic geometry.

10. The catalytic converter reactor according to claim 7, wherein the catalytic converter modules comprise at least four catalytic converter modules positioned after one another in the row.

11. The catalytic converter reactor according to claim 7, wherein each V-shaped section of the plurality of adjoining V-shaped sections extends vertically.

* * * * *